United States Patent
Yamagishi

(10) Patent No.: US 11,968,057 B2
(45) Date of Patent: Apr. 23, 2024

(54) DOCUMENT-USAGE CONTROL APPARATUS, NON-TRANSITORY COMPUTER READABLE MEDIUM, AND ONLINE CONFERENCE SYSTEM

(71) Applicant: FUJIFILM Business Innovation Corp., Tokyo (JP)

(72) Inventor: Hiroki Yamagishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/711,659

(22) Filed: Apr. 1, 2022

(65) Prior Publication Data
US 2023/0086705 A1 Mar. 23, 2023

(30) Foreign Application Priority Data
Sep. 15, 2021 (JP) .................................. 2021-150015

(51) Int. Cl.
*H04L 12/18* (2006.01)
*H04L 65/401* (2022.01)
*H04L 65/403* (2022.01)

(52) U.S. Cl.
CPC ...... *H04L 12/1831* (2013.01); *H04L 12/1822* (2013.01); *H04L 65/4015* (2013.01); *H04L 65/403* (2013.01)

(58) Field of Classification Search
CPC ............. H04L 12/1831; H04L 12/1822; H04L 65/4015; H04L 65/403
See application file for complete search history.

(56) References Cited

U.S. PATENT DOCUMENTS

| | | | |
|---|---|---|---|
| 10,142,476 B1* | 11/2018 | Chen | H04M 3/5183 |
| 2005/0097169 A1* | 5/2005 | Mukherjee | H04L 65/765 |
| | | | 709/204 |
| 2005/0265533 A1* | 12/2005 | White | H04L 65/80 |
| | | | 709/204 |
| 2008/0273474 A1* | 11/2008 | Yanagihara | H04L 45/48 |
| | | | 370/256 |
| 2012/0011249 A1* | 1/2012 | Wong | G06Q 10/10 |
| | | | 709/224 |
| 2012/0163576 A1* | 6/2012 | Bentley | H04M 3/563 |
| | | | 379/202.01 |
| 2012/0182384 A1* | 7/2012 | Anderson | H04L 65/1073 |
| | | | 348/14.09 |
| 2013/0108034 A1* | 5/2013 | Colbert | H04M 3/566 |
| | | | 379/202.01 |

(Continued)

FOREIGN PATENT DOCUMENTS

| | | |
|---|---|---|
| JP | 2007-052557 A | 3/2007 |
| JP | 2012-141752 A | 7/2012 |

*Primary Examiner* — William G Trost, IV
*Assistant Examiner* — Abdelbasst Talioua
(74) *Attorney, Agent, or Firm* — Oliff PLC

(57) ABSTRACT

A document-usage control apparatus includes a memory in which a piece of relationship information is registered for each pair of users, the piece of relationship information indicating a relationship between the pair of users, and a processor configured to control use of a document to be shared at an online conference for each user attending the online conference, the use being controlled based on one or more pieces of relationship information registered in the memory.

16 Claims, 12 Drawing Sheets

(56) References Cited

U.S. PATENT DOCUMENTS

| | | | |
|---|---|---|---|
| 2014/0006495 A1* | 1/2014 | Adderly | H04L 65/403 |
| | | | 709/204 |
| 2014/0125759 A1* | 5/2014 | Chalasani | H04N 7/152 |
| | | | 348/14.09 |
| 2014/0279335 A1* | 9/2014 | Sandhu | G06Q 40/04 |
| | | | 705/35 |
| 2016/0014277 A1* | 1/2016 | Tichauer | H04L 65/4053 |
| | | | 370/260 |
| 2016/0088259 A1* | 3/2016 | Anderson | H04N 7/157 |
| | | | 348/14.03 |
| 2016/0165056 A1* | 6/2016 | Bargetzi | G06F 3/1454 |
| | | | 455/416 |
| 2017/0093935 A1* | 3/2017 | Caston | H04L 65/403 |
| 2017/0109709 A1* | 4/2017 | Wu | G06F 16/358 |
| 2018/0082263 A1* | 3/2018 | Michels | H04L 65/403 |
| 2018/0357440 A1* | 12/2018 | Brady | H04L 63/08 |
| 2019/0103985 A1* | 4/2019 | Barsoba | H04L 65/403 |
| 2020/0100074 A1* | 3/2020 | Purohit | H04W 4/023 |
| 2020/0280456 A1* | 9/2020 | Kubo | H04L 12/1831 |
| 2020/0342414 A1* | 10/2020 | Smith | G06Q 30/018 |
| 2021/0019705 A1* | 1/2021 | Yu | G06Q 10/103 |
| 2021/0314375 A1* | 10/2021 | Sharma | H04L 65/4038 |
| 2022/0391354 A1* | 12/2022 | Ha | G06F 16/954 |
| 2023/0082335 A1* | 3/2023 | Kambara | H04L 12/1822 |
| | | | 709/204 |
| 2024/0007317 A1* | 1/2024 | Lundberg | H04L 12/1818 |

* cited by examiner

FIG. 2

| CONFERENCE ID | ORGANIZER | CONFERENCE NAME | ATTENDEE | STARTING TIME | ... |
|---|---|---|---|---|---|
| 0001 | EMPLOYEE A (ID: 0001) | REGARDING PROJECT Y | AFFILIATE COMPANY EMPLOYEE B (ID: 0002) | 2021/02/25 15:00 | ... |
| 0002 | EMPLOYEE D (ID: 0004) | REGARDING HUMAN RESOURCES SYSTEM | EMPLOYEE E (ID: 0001) | 2021/02/26 13:00 | ... |
| ... | ... | ... | ... | ... | ... |

FIG. 3

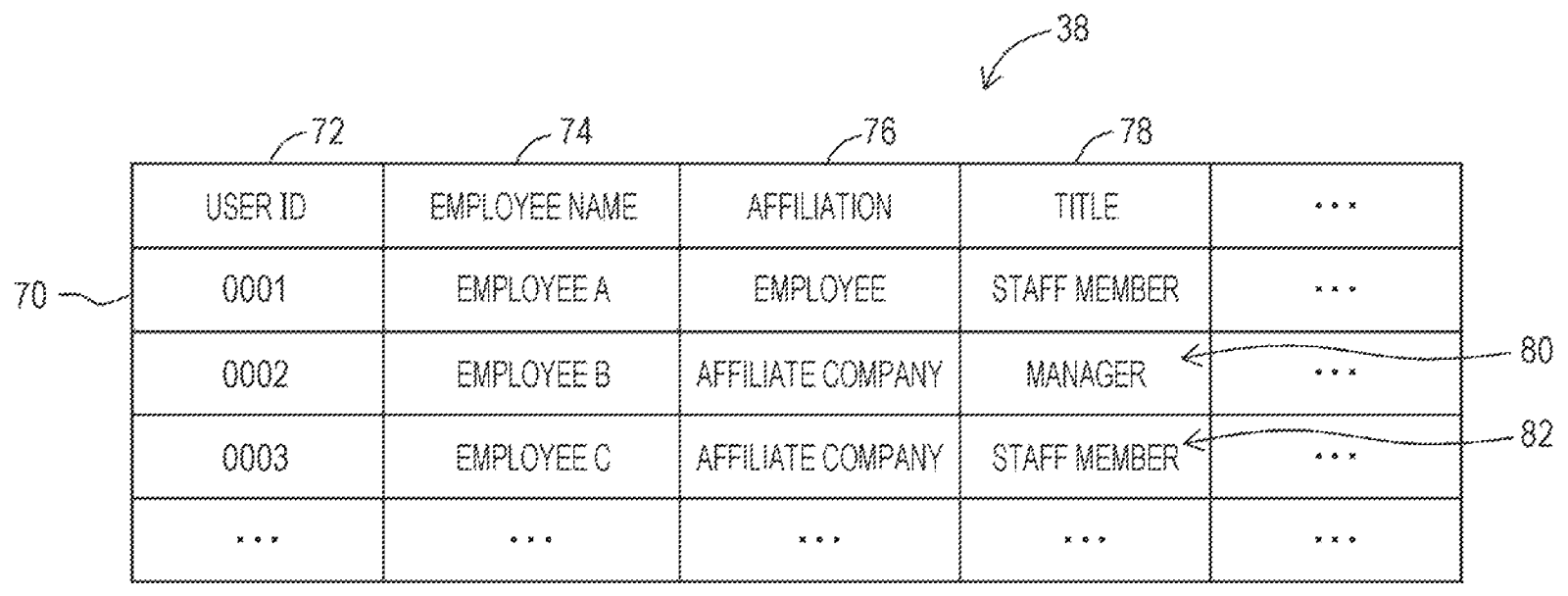

| USER ID | EMPLOYEE NAME | AFFILIATION | TITLE | ... |
|---|---|---|---|---|
| 0001 | EMPLOYEE A | EMPLOYEE | STAFF MEMBER | ... |
| 0002 | EMPLOYEE B | AFFILIATE COMPANY | MANAGER | ... |
| 0003 | EMPLOYEE C | AFFILIATE COMPANY | STAFF MEMBER | ... |
| ... | ... | ... | ... | ... |

FIG. 4

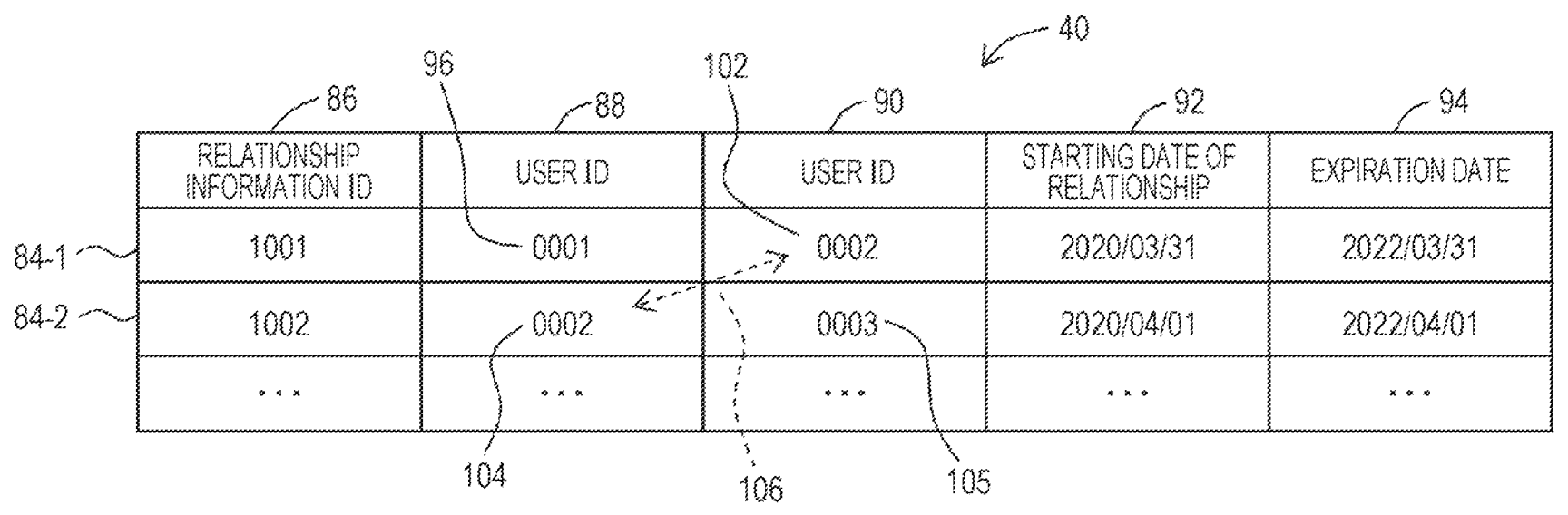

| RELATIONSHIP INFORMATION ID | USER ID | USER ID | STARTING DATE OF RELATIONSHIP | EXPIRATION DATE |
|---|---|---|---|---|
| 1001 | 0001 | 0002 | 2020/03/31 | 2022/03/31 |
| 1002 | 0002 | 0003 | 2020/04/01 | 2022/04/01 |
| ... | ... | ... | ... | ... |

FIG. 11

| RELATIONSHIP INFORMATION ID | USER ID OF STARTING POINT OF RELATIONSHIP | USER ID OF END POINT OF RELATIONSHIP | STARTING DATE OF RELATIONSHIP | EXPIRATION DATE | ADDITIONAL CONDITION | |
|---|---|---|---|---|---|---|
| 1001 | 0001 | 0002 | 2020/03/31 | 2022/03/31 | ***** | ... |
| 1002 | 0002 | 0003 | 2020/04/01 | 2022/04/01 | ***** | ... |
| ... | ... | ... | ... | ... | ... | ... |

DOCUMENT-USAGE CONTROL APPARATUS, NON-TRANSITORY COMPUTER READABLE MEDIUM, AND ONLINE CONFERENCE SYSTEM

CROSS-REFERENCE TO RELATED APPLICATIONS

This application is based on and claims priority under 35 USC 119 from Japanese Patent Application No. 2021-150015 filed Sep. 15, 2021.

BACKGROUND

(i) Technical Field

The present disclosure relates to a document-usage control apparatus, a non-transitory computer readable medium, and an online conference system including the document-usage control apparatus.

(ii) Related Art

Online conferences are used in such fields as business, education, and public administration. An online conference is a remote meeting and is also referred to as a web conference. A document is generally shared at an online conference by multiple users who attend the online conference (that is, multiple attendees at the online conference). In such a case, the document is shared by all the attendees.

Japanese Unexamined Patent Application Publication No. 2007-52557 discloses a technique for setting a range of people with whom information is to be shared in a sociogram, which can also be referred to as a user network. Japanese Unexamined Patent Application Publication No. 2012-141752 discloses an apparatus for detecting the degree of relationship between conferences. These patent documents do not describe control of a document to be shared at an online conference.

SUMMARY

If a document is disclosed across the board to all users who attend an online conference, an issue concerning information security sometimes arises. If all users across the board are allowed to manipulate (for example, download) a document, a similar issue also arises. It is hoped that a technique is provided to control a sharing range for a document in consideration of connections or relationships between users (for example, relationships with an organizing user who is an organizer of an online conference).

Aspects of non-limiting embodiments of the present disclosure relate to providing a technique by which use of a document to be shared at an online conference can be controlled for each user who attends the online conference.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a document-usage control apparatus including a memory in which a piece of relationship information is registered for each pair of users, the piece of relationship information indicating a relationship between the pair of users, and a processor configured to control use of a document to be shared at an online conference for each user attending the online conference, the use being controlled based on one or more pieces of relationship information registered in the memory.

BRIEF DESCRIPTION OF THE DRAWINGS

Exemplary embodiments of the present disclosure will be described in detail based on the following figures, wherein:

FIG. 2 is an illustration depicting an example of a conference control table;

FIG. 3 is an illustration depicting an example of a user control table;

FIG. 4 is an illustration depicting an example of a relationship information database;

FIG. 11 is an illustration depicting another example of a relationship information database.

DETAILED DESCRIPTION

Figure 1:
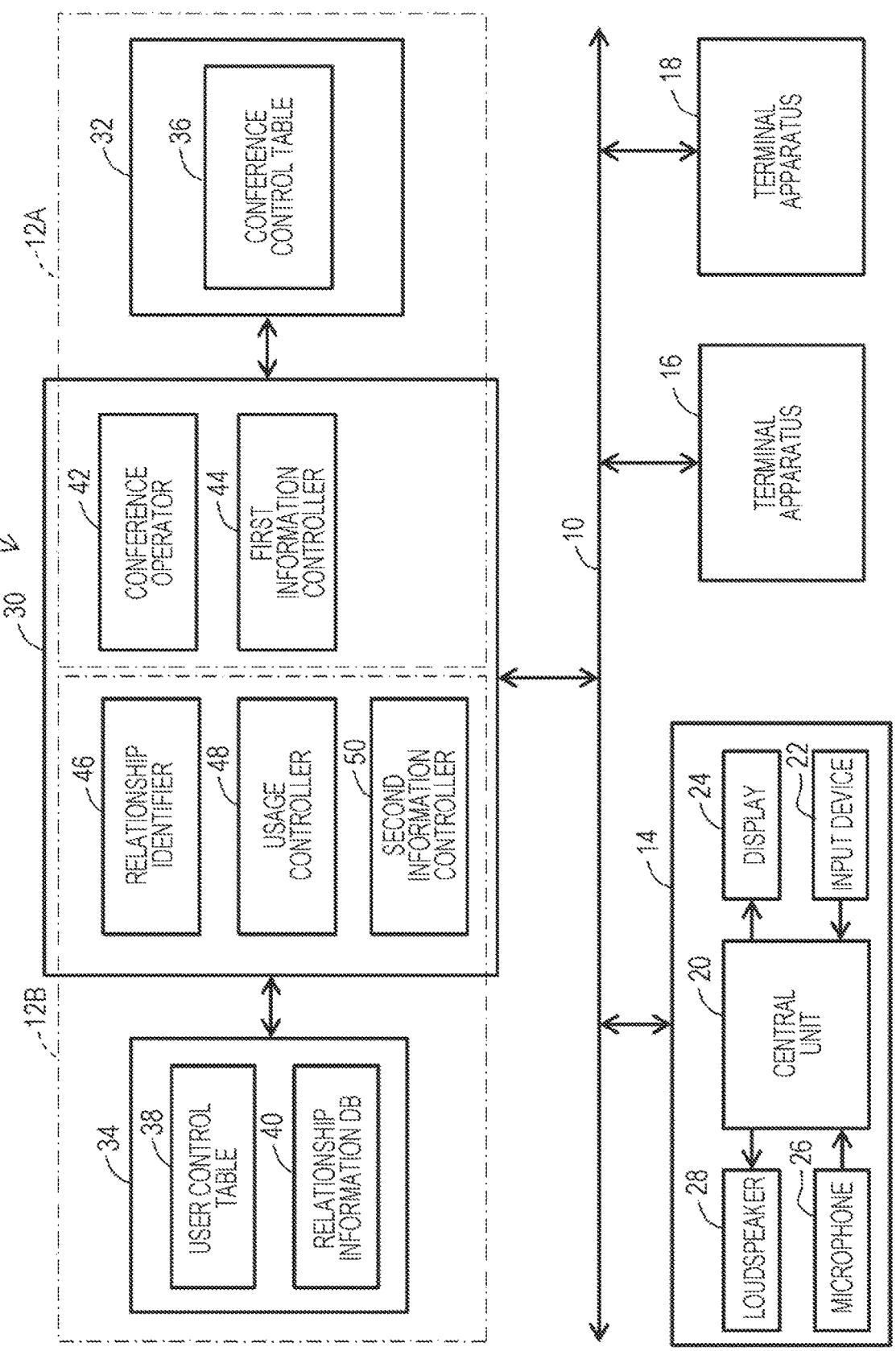
FIG. 1 is a block diagram depicting an online conference system according to one of the exemplary embodiments.

Hereinafter, exemplary embodiments will be described with reference to the drawings.

(1) Outline of Exemplary Embodiments

A document-usage control apparatus according to each exemplary embodiment includes a memory and a processor. A piece of relationship information, which indicates a relationship between a pair of users, is registered in the memory for each pair of users. Based on one or more pieces of relationship information registered in the memory, the processor is configured to control the use of a document, which is to be shared at an online conference, for each user who attends the online conference.

A pair of users is a basic unit for identifying a human relationship in a group formed by multiple users. A piece of relationship information is registered in the memory for each pair of users. Human relationships covering all the users who attend an online conference can be identified based on one or more pieces of relationship information registered in the memory. Based on the human relationships, use of a document to be shared at the online conference is controlled for each user who attends the online conference. For example, it is determined whether each user who attends the online conference has a relationship with the organizing user, and the use of the document is allowed or restricted for each user based on the determination.

In other words, in the above configuration, a sharing range for the document (the sharing range can also be referred to as a range of people who share the document) is specified based on the human relationships at the online conference apart from the attendance range for the online conference (the attendance range can also be referred to as a range of attendees).

As described below, a relationship between users is categorized as a direct relationship or an indirect relationship. A direct relationship is a relationship between users involving no intermediary user. An indirect relationship is a relationship between users involving one or more intermediary users and corresponds to a chain formed by multiple direct relationships. An intermediary user has a direct relationship with each of two users and is shared by the two users.

The processor is configured to identify each direct relationship based on a piece of relationship information registered in the memory and identify each indirect relationship based on multiple pieces of relationship information registered in the memory, that is, multiple direct relationships. For example, the use of a document is allowed for a user who is recognized as having a direct or indirect relationship with the organizer, and the use of a document is restricted for a user who is not recognized as having a direct or indirect relationship with the organizer. A direct or indirect relationship may also be defined based on a relationship with a user who is different from the organizing user and who serves as a starting point.

Examples of a document include various kinds of data, such as text data, drawing data, and table data. Examples of a user can include a user group. Examples of the control of document usage can include restriction of viewing and referring to a document and restriction of manipulating a document. In addition to the relationship with the user at the starting point, document usage may be controlled for each user based on information such as an attribute of the user at the starting point and an attribute of a document to be shared. In general, document sharing indicates an action by which a document specified by an attendee as a document to be shared is provided to other attendees and made available to the other attendees, who refer to or perform other operation on the document. Document sharing also indicates a state in which a document is available to the other attendees.

In each exemplary embodiment, the processor is configured to restrict the use of a document by a specific user when any one of one or more intermediary users involved in an indirect relationship exits an online conference after the processor allows the specific user to use the document based on the indirect relationship.

If the specific user is allowed to use a document on the assumption that the specific user has a relationship with the organizing user via an intermediary user, the exit of the intermediary user from the online conference is likely to undermine the validity of the above assumption. Alternatively, it can also be said that the intermediary user has a certain level of administrative responsibility with respect to the document usage by the specific user. From this viewpoint, the use of the document by the specific user is restricted after the intermediary user exits in the above configuration. A piece of relationship information indicating a relationship between the organizing user and the specific user needs to be registered in the memory to allow the specific user to continue or resume using the document.

In the exemplary embodiment, the processor is configured to construct a user tree starting from the organizing user based on multiple pieces of relationship information registered in the memory. The processor is configured to identify an indirect relationship by sequentially following direct relationships in the user tree. Multiple users who attend an online conference are used as building elements to construct a user tree, and a relationship range in which one or more indirect relationships between users are recognized may be identified in the user tree. Alternatively, multiple users who attend an online conference and who satisfy a certain condition for being recognized as having an indirect relationship may be used as building elements to construct a user tree. In such a case, the user tree constructed in this way itself corresponds to a relationship range.

In the exemplary embodiment, apart from the attendance range for an online conference, the processor is configured to define a sharing range for a document to be shared at the online conference by controlling the use of the document for each user who attends the online conference. Defining a sharing range apart from the attendance range eliminates an issue (such as an information security issue) caused by disclosing the document to attendees across the board or allowing attendees across the board to use the document.

In the exemplary embodiment, a sharing range is a relationship range specified based on one or more pieces of relationship information in an attendance range. An overlapping portion of an attendance range and a relationship range that are independently specified may be identified as a sharing range.

In the exemplary embodiment, the processor is configured to renew a relationship range when an attendance range changes. The renewal of a relationship range leads to a renewal of a sharing range. In this configuration, a change in an attendance range, that is, a change in the composition of attendees triggers the renewal of a sharing range. A sharing range may be set when each document starts to be shared, and the sharing range may be renewed at regular intervals.

In the exemplary embodiment, each piece of relationship information includes information specifying a first user and a second user who have a direct relationship with each other. A piece of relationship information may be shared by multiple online conferences. A piece of relationship information may include a timing condition for recognizing a direct relationship between users. Examples of a timing condition can include a time when a relationship starts, a time when a relationship ends, and a period during which a relationship is effective.

An online conference system according to the exemplary embodiment includes an online-conference operation apparatus and the document-usage control apparatus. The online-conference operation apparatus is configured to provide multiple users with an online conference service. The document-usage control apparatus is configured to control the use of a document to be shared at an online conference held based on the online conference service. The document-usage control apparatus includes a memory and a processor. A piece of relationship information, which indicates a relationship between a pair of users, is registered in the memory for each pair of users. Based on one or more pieces of relationship information registered in the memory, the processor is configured to control the use of a document, which is to be shared at an online conference, for each user who attends the online conference.

In the exemplary embodiment, the document-usage control apparatus is configured to restrict the use of a document or provide another apparatus with an instruction for restricting the use of a document. The restriction of document usage includes at least one of restriction of viewing a document and restriction of manipulating a document.

In the exemplary embodiment, a program is executed in an information processing apparatus to perform a document-usage control method. The program is installed on the information processing apparatus by using a portable recording medium or a network. The program may be stored in a non-transitory recording medium. Examples of the information processing apparatus can include an apparatus having an information processing function, such as a computer or a server.

(2) Details of Exemplary Embodiments

FIG. 1 depicts an online conference system according to an exemplary embodiment. This online conference system is used in various fields such as business, education, and public administration. The term "online conference" is a broad concept and can encompass various online meetings. For example, the online conference system depicted in FIG. 1 is used at an online conference that is held when multiple companies cooperate and carry out a project.

A network 10 is, for example, the Internet in FIG. 1. All or a portion of the network 10 may be formed by an intra-company local area network (LAN). Multiple terminal apparatuses 14, 16, and 18 are connected to the network 10. Each of the terminal apparatuses 14, 16, and 18 is an information processing apparatus and has the same configuration in the example depicted in FIG. 1.

As depicted in FIG. 1, the terminal apparatus 14 includes a central unit 20, an input device 22, a display 24, a microphone 26, and a loudspeaker 28. The central unit 20 includes a processor, such as a central processing unit (CPU), which is configured to execute a program. The input device 22 is formed by, for example, a keyboard and a mouse, and the display 24 is formed by, for example, a liquid crystal display. The microphone 26 and the loudspeaker 28 are used in addition to the input device 22 and the display 24 at an online conference.

In the example configuration depicted in FIG. 1, for example, the terminal apparatus 14 is an apparatus used by an organizing user of an online conference, and the organizing user is a person in charge in a company (client company) that outsources a specific operation. The user who uses the terminal apparatus 16 is a manager (superior) in a company (outsourced company) to which the specific operation is outsourced, and the user who uses the terminal apparatus 18 is a person in charge in the outsourced company.

An online conference server 12 is connected to the network 10. The online conference server 12 is configured to provide an online conference service. In the example configuration depicted in FIG. 1, the online conference server 12 includes a central unit 30, a first memory unit 32, and a second memory unit 34. The central unit 30 is formed by a processor, such as a CPU, which is configured to execute a program. The first memory unit 32 and the second memory unit 34 are each formed by a device such as a semiconductor memory or a hard disk. The first memory unit 32 and the second memory unit 34 may be formed on a single recording medium.

A conference control table 36 is formed in the first memory unit 32. The conference control table 36 corresponds to a conference list having multiple pieces of conference information as illustrated by a specific example below. A user control table 38 and a relationship information database (DB) 40 are formed in the second memory unit 34. The user control table 38 corresponds to a user list having multiple pieces of user information as illustrated by a specific example below.

Multiple pieces of relationship information are registered in the relationship information DB 40 as illustrated by a specific example below. The relationship information DB 40 may be shared by multiple online conferences. Each piece of relationship information represents a relationship between a first user and a second user (that is, a relationship between a pair of users). The relationship is a direct relationship, which will be described below. Each user is a user of an online conference service and is allowed to attend an online conference. Upon attending an online conference, the user is an attendee at the online conference.

The central unit 30 is configured to perform multiple functions. Those functions are represented by multiple blocks in FIG. 1. Specifically, the central unit 30 is configured to function as a conference operator 42, a first information controller 44, a relationship identifier 46, a usage controller 48, and a second information controller 50.

The conference operator 42 is configured to execute, operate, and control an online conference based on each piece of conference information registered on the conference control table 36. The conference operator 42 is configured to manage connections, distribute images and sounds, and perform other conference operations. The conference operator 42 is also configured to distribute a document to be shared at an online conference. However, in the exemplary embodiment, the use of a document is allowed or restricted by the usage controller 48 described below for each user who attends an online conference.

The first information controller 44 is configured to register conference information on the conference control table 36. In addition, the first information controller 44 is configured to perform maintenance of the conference control table 36.

Based on multiple pieces of relationship information stored in the relationship information DB 40, the relationship identifier 46 is configured to identify whether each user who attends an online conference has a relationship (specifically, a direct or indirect relationship) with the organizing user. Whether the user has a relationship with a user other than the organizing user may be identified. Examples of the user other than the organizing user include a person responsible for a project and a person responsible for outsourcing.

The usage controller 48 is configured to allow a user who is recognized as having a relationship with the organizing user to use a document to be shared at an online conference. The usage controller 48 is configured to restrict the use of a document to be shared at an online conference for a user who is not recognized as having a relationship with the organizing user. The usage controller 48 may directly impose such restriction or provide another apparatus or another module with an instruction for imposing such restriction.

The second information controller 50 is configured to register user information on the user control table 38 and also register relationship information in the relationship information DB 40. When user information or relationship information is sent from a specific terminal apparatus to the online conference server 12, the second information controller 50 registers such information. As a modification, the second information controller 50 may automatically generate and register relationship information if a user satisfies a certain condition.

A portion denoted by a symbol 12A in FIG. 1 corresponds to an online-conference operation apparatus. A portion denoted by a symbol 12B in FIG. 1 corresponds to a document-usage control apparatus.

FIG. 2 depicts an example configuration of the conference control table 36. The conference control table 36 depicted in FIG. 2 includes multiple pieces of conference information 54 each corresponding to an online conference. Each piece of conference information 54 includes information such as an item "conference identifier (ID)" 56, an item "organizer" 58, an item "conference name" 60, an item "attendee" 62, and an item "starting time" 64. In the example depicted in FIG. 2, an employee A is the organizing user (organizer) who belongs to a client company as denoted by a symbol 66. The user ID of the organizer is registered as the item "organizer" 58. As denoted by a symbol 68, an employee B is a user (attendee) who belongs to an affiliate company (outsourced company), and the user ID of the attendee is registered as the item "attendee" 62. A person who registers a piece of conference information is the organizing user or a user who has a certain level of authority.

FIG. 3 depicts an example configuration of the user control table 38. The user control table 38 depicted in FIG. 3 includes multiple pieces of user information 70 each corresponding to a user. Each piece of user information 70 includes information such as an item "user ID" 72, an item "employee name" 74, an item "affiliation" 76, and an item "title" 78. As denoted by a symbol 80, the employee B is a manager of the affiliate company (outsourced company), and as denoted by a symbol 82, an employee C is a staff member of the affiliate company. Before starting an online conference, the piece of user information of each user who attends the online conference is registered on the user control table 38. A person who registers pieces of user information is the organizing user or a user who has a certain level of authority.

FIG. 4 depicts an example configuration of the relationship information DB 40. The relationship information DB 40 depicted in FIG. 4 includes multiple pieces of relationship information 84-1 and 84-2 each corresponding to a pair of users. The pieces of relationship information 84-1 and 84-2 each represent a connection or a relationship between a pair of users. The pieces of relationship information 84-1 and 84-2 each include information such as an item "relationship information ID" 86, an item "user ID" 88 of a first user, an item "user ID" 90 of a second user, an item "starting date of relationship" 92, and an item "expiration date" 94. The first user is one user of a pair of users, and the second user is the other user of the pair of users. In the example configuration depicted in FIG. 4, the order in which a user is referred to, that is, directionality between a pair of users is not taken into account.

In more detail, the piece of relationship information 84-1 represents a relationship between the employee A (user ID: 0001) and the employee B (user ID: 0002) as denoted by symbols 96 and 102. The relationship is a direct relationship involving no intermediary user. The piece of relationship information 84-2 represents a relationship between the employee B (user ID: 0002) and the employee C (user ID: 0003) as denoted by symbols 104 and 105. The relationship is also a direct relationship involving no intermediary user. Registration of each of the pieces of relationship information 84-1 and 84-2 corresponds to registration of a direct relationship.

The employee B (user ID: 0002) is involved in the two pieces of relationship information 84-1 and 84-2 (refer to a symbol 106). In this case, the employee B is an intermediary user, who can also be referred to as a common user, for the employee A (user ID: 0001) and the employee C (user ID: 0003), especially for the employee C (user ID: 0003). The employee A (user ID: 0001) and the employee C (user ID: 0003) are connected to each other via the employee B (user ID: 0002), who is an intermediary user, and the relationship between the employee A and the employee C is an indirect relationship.

The employee A (user ID: 0001) and the employee C (user ID: 0003) do not have a direct relationship but have an indirect relationship with each other. If two users have a relationship with each other not via a single intermediary user but via multiple intermediary users, the two users can also be recognized as having an indirect relationship. How far apart two users can be while being recognized as having an indirect relationship with each other can freely be determined by setting a search condition described below. The range in which users are allowed to use a document is demarcated based on indirect relationships. The range in which users are allowed to use a document may be limited to direct relationships.

A piece of relationship information is registered by the organizing user or a user who has a certain level of authority. Approval from a third party may be required to register a piece of relationship information. For example, when a user who has a certain level of authority registers a piece of relationship information, approval from the organizing user may be required. A piece of relationship information may automatically be registered. For example, the second information controller 50 may automatically register a piece of relationship information representing a relationship between each user and the organizing user in the relationship information DB 40. The registration may be based on parameters such as the amount of talk by the user who is at an online conference and the length of a period during which the user is at the online conference. When registering the piece of relationship information, the second information controller 50 may seek approval from the organizing user.

Figure 5:
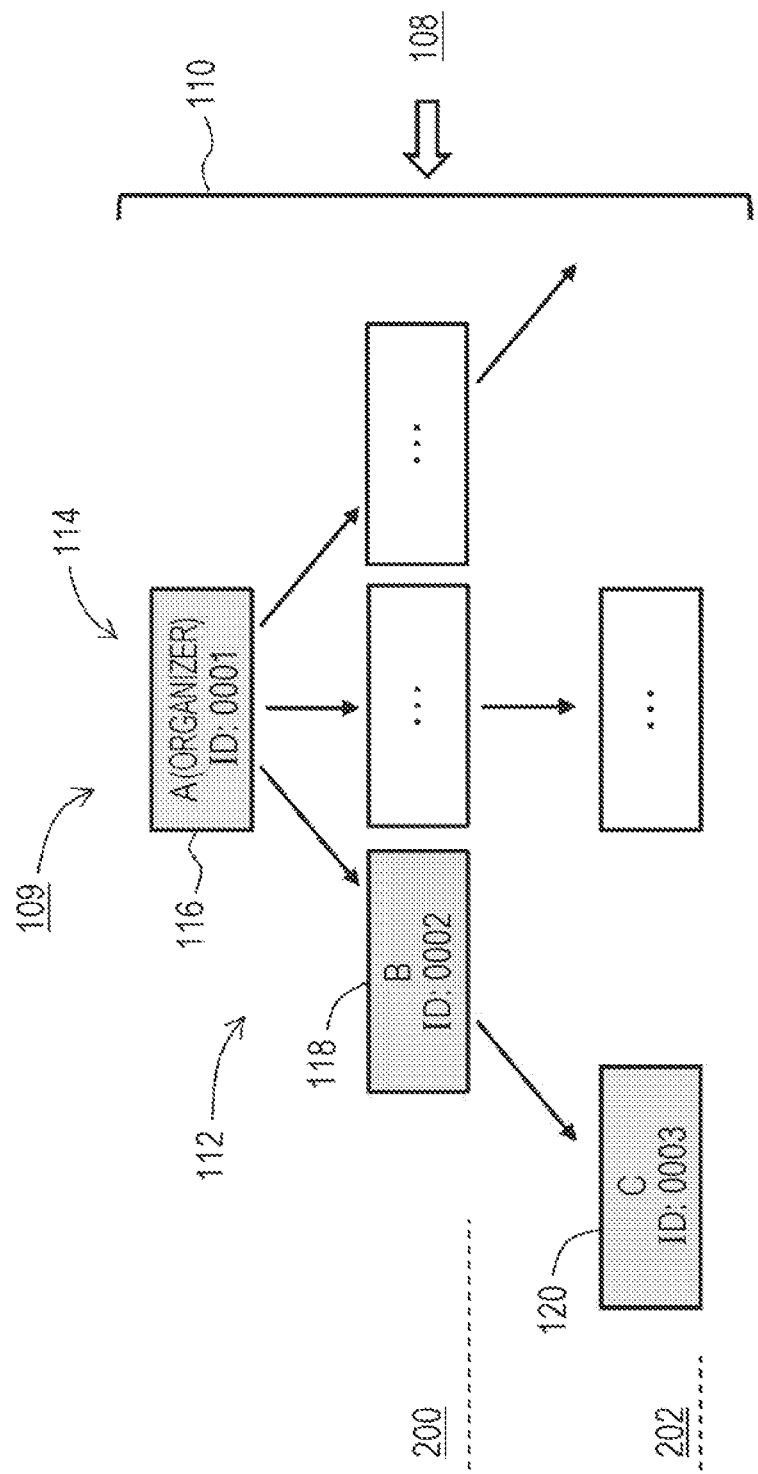
FIG. 5 is a diagram depicting a sharing range determined based on a user tree.

FIG. 5 depicts a user tree 109 created by the relationship identifier 46. The user tree 109 is created based on multiple pieces of relationship information in the relationship information DB 40. Although the user tree 109 is created in an attendance range 114 of an online conference in the exemplary embodiment, the user tree 109 may be created beyond the attendance range 114.

The user tree 109 has an organizer (user A) 116 at the starting point or the top and is formed by sequentially following direct relationships starting from the organizer 116. In the example depicted in FIG. 5, the organizer 116 and an attendee (user B) 118 have a direct relationship, and the attendee 118 and an attendee (user C) 120 also have a direct relationship. A symbol 200 denotes a primary range having the organizer 116 as the starting point, and a symbol 202 denotes a secondary range having the organizer 116 as the starting point.

For example, if the secondary range 202 is specified as a search condition 108, the range denoted by a symbol 110 is identified as the relationship range. The relationship range 110 defines a sharing range 112 in the attendance range 114, or the overlapping portion of the attendance range 114 and the relationship range 110 defines the sharing range 112.

A user tree is also referred to as a neighborhood list. A breadth first search algorithm or a depth first search algorithm may be used to create a user tree or search a user tree. A condition other than the order may be specified as the search condition 108.

Figure 6:
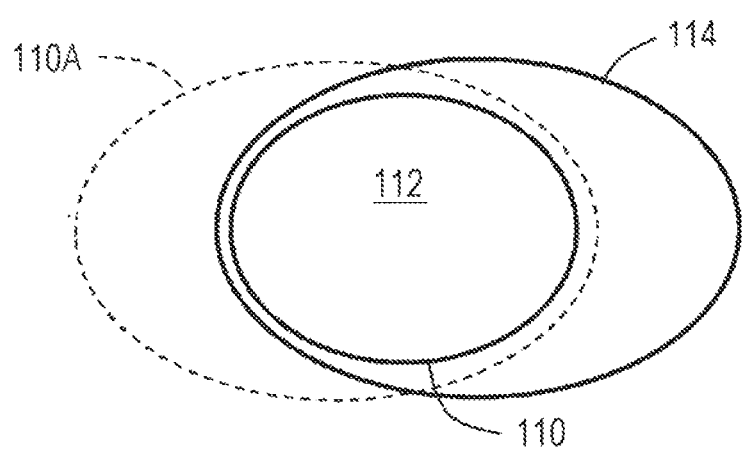
FIG. 6 is a diagram depicting a relationship among an attendance range, a relationship range, and a sharing range.

FIG. 6 schematically depicts a relationship among the three ranges, which are the relationship range 110, the attendance range 114, and the sharing range 112. In the exemplary embodiment, the relationship range 110, which is included in the attendance range 114, defines the sharing range 112. If a relationship range 110A is set completely independently of the attendance range 114, the overlapping portion of the attendance range 114 and the relationship range 110A defines the sharing range 112.

Figure 7:
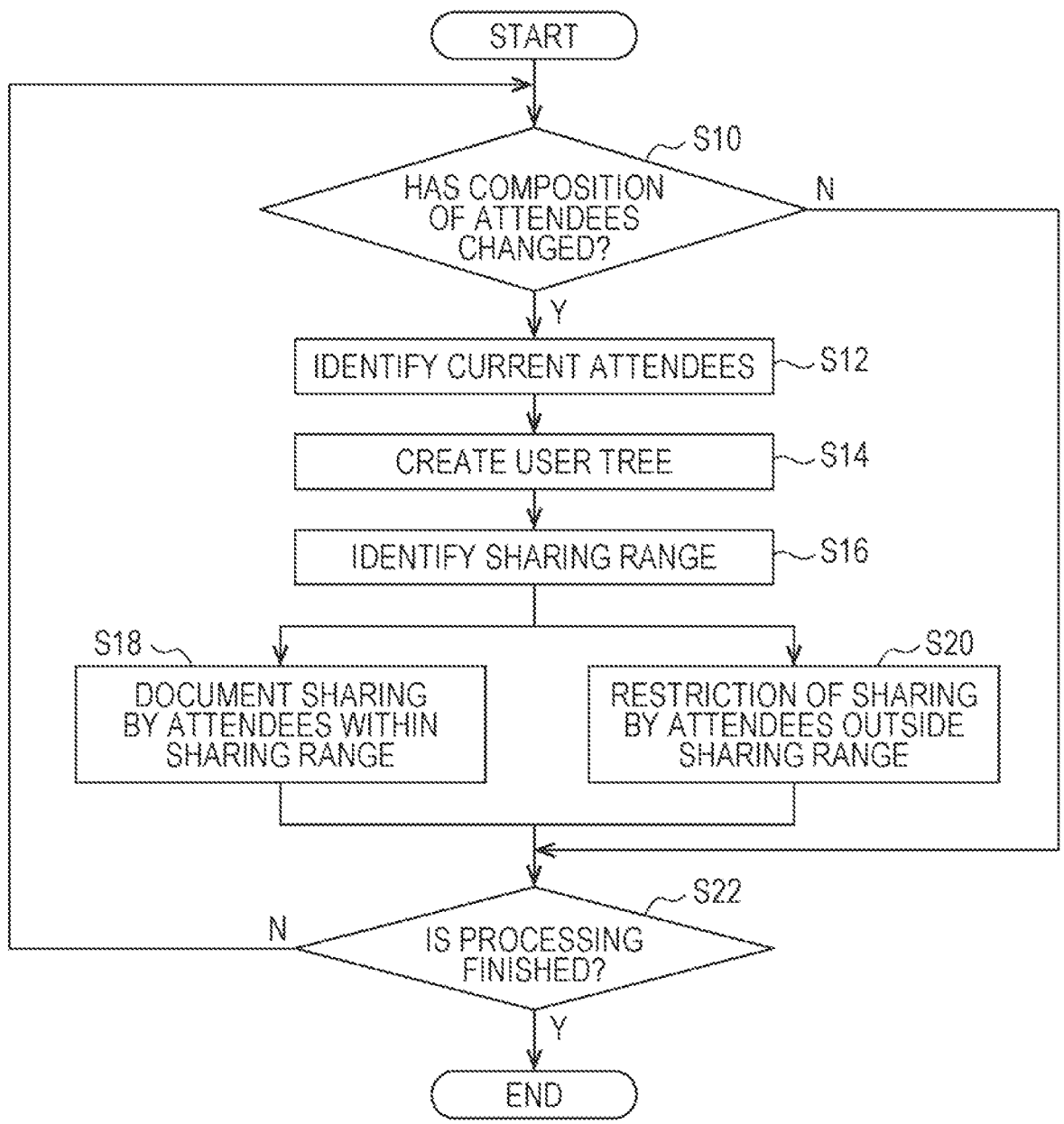
FIG. 7 is a flowchart depicting a method of controlling document usage according to the exemplary embodiment.

FIG. 7 depicts, as a flowchart, operations of the document-usage control apparatus 12B, particularly operations of the relationship identifier 46 and the usage controller 48. In step S10, it is determined whether the composition of attendees at an online conference has changed. If the composition of attendees has changed, a series of steps starting from step S12 is performed. Although it is not explicitly depicted in FIG. 7, when document sharing starts, the series of steps starting from step S12 is performed. The series of steps starting from step S12 may be performed at regular intervals, or the occurrence of other events may cause the series of steps starting from step S12 to be performed.

In step S12, one or more current users who are at an online conference (that is, the attendance range) are identified. In step S14, a user tree is created based on the one or more current users that have been identified. In step S16, a range (relationship range) that satisfies a search condition is identified as a sharing range in the user tree that has been created.

Steps S18 and S20 are performed in parallel. In step S18, one or more users within the sharing range are allowed to share a document. For example, the document is allowed to be distributed to the one or more users. In step S20, the use of the document is restricted for one or more users outside the sharing range. For example, the document distribution to the one or more users is forbidden, or the document is distributed to the one or more users after being made illegible. Until it is determined in step S22 that the processing is finished, the steps starting from step S10 are repeatedly performed.

Figure 8:
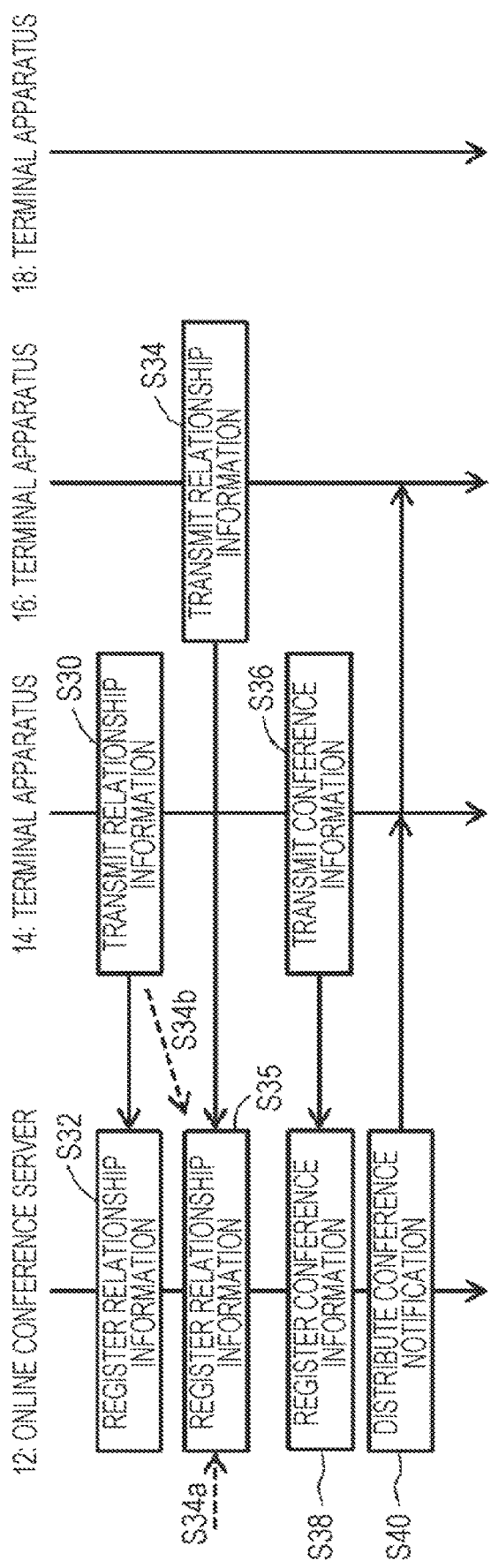
FIG. 8 is a diagram depicting a system operation for registering relationship information.
Figure 9:
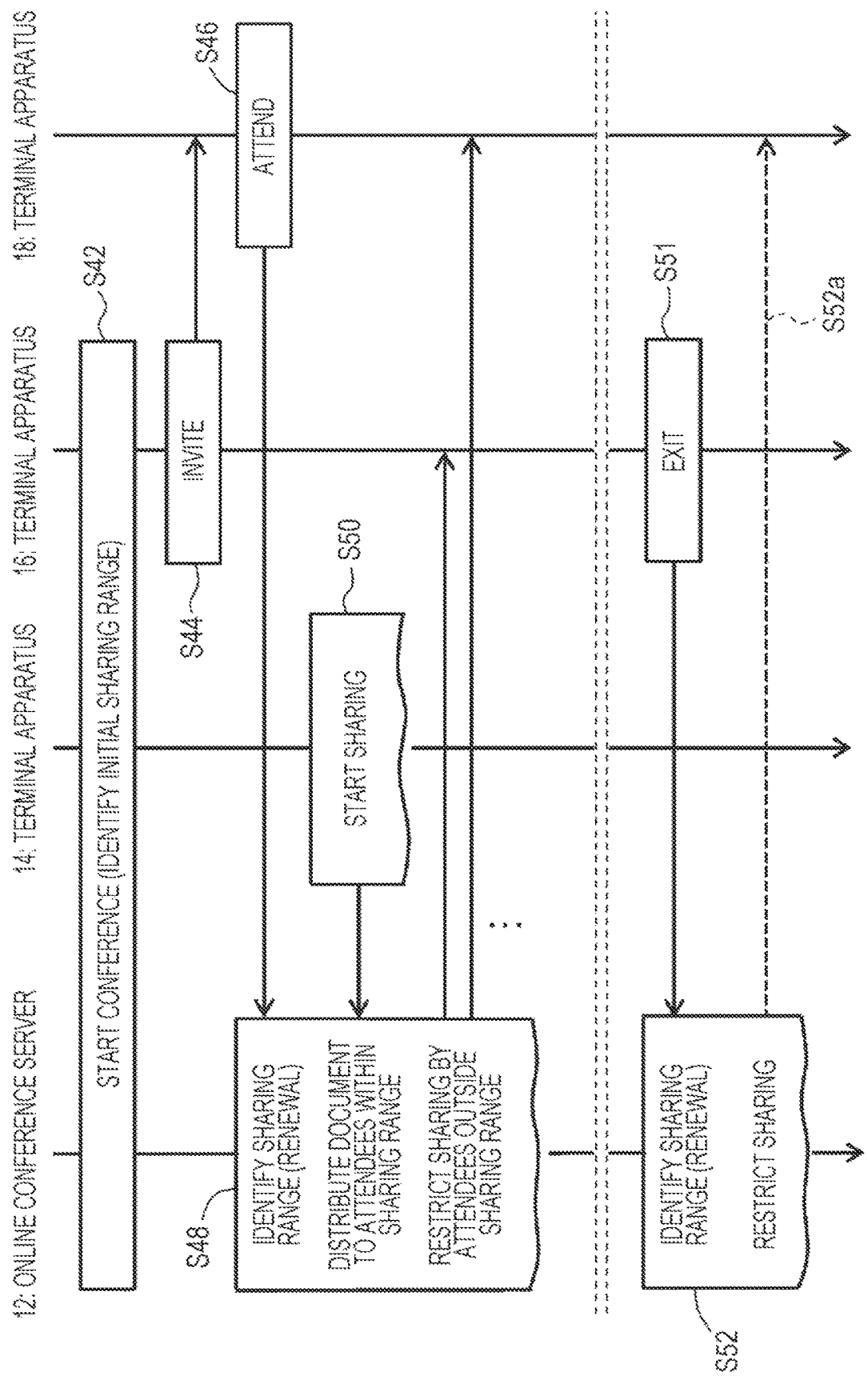
FIG. 9 is a diagram depicting a system operation for sharing a document.

FIGS. 8 and 9 depict, as a flowchart, operations performed by the online conference server 12 according to the exemplary embodiment to share a document. FIG. 8 depicts operations before starting an online conference, and FIG. 9 depicts operations after starting the online conference. FIGS. 8 and 9 depict, from left to right, operations of the online conference server 12, operations of the terminal apparatus 14 used by the organizing user A, operations of the terminal apparatus 16 used by the employee B who is a manager of the affiliate company, and operations of the terminal apparatus 18 used by the employee C who is a staff member of the affiliate company.

In FIG. 8, in step S30, the terminal apparatus 14 transmits a piece of relationship information to the online conference server 12. In step S32, the piece of relationship information is registered in the relationship information DB 40. The piece of relationship information represents a direct relationship between the employee A and the employee B (refer to the symbol 84-1 in FIG. 4). In the example operation depicted in FIG. 8, in step S34, the terminal apparatus 16 transmits another piece of relationship information to the online conference server 12. In step S35, the other piece of relationship information is registered in the relationship information DB 40. The other piece of relationship information represents a direct relationship between the employee B and the employee C (refer to the symbol 84-2 in FIG. 4). The other piece of relationship information may be registered by an operation of a third party having a certain level of authority, such as a person responsible for the project (refer to a symbol S34a), or the other piece of relationship information may be registered by an operation of the organizing user (refer to a symbol S34b).

In step S36, the terminal apparatus 14 transmits a piece of conference information to the online conference server 12, and the piece of conference information is registered on the conference control table 36 in step S38 (refer to the symbol 54 in FIG. 2). In step S40, the online conference server 12 distributes a conference notification to attendees at the online conference. In the example depicted in FIG. 8, the conference notification is delivered to the terminal apparatuses 14 and 16. The piece of conference information may be registered before the pieces of relationship information are registered.

In FIG. 9, the online conference is started in step S42. When the online conference is started, the initial sharing range is identified as required. In the example operation depicted in FIG. 9, in step S44, the terminal apparatus 16 transmits to the terminal apparatus 18 a piece of conference information including access information. This transmission corresponds to so-called invitation. For example, while the user B is at the online conference, execution of step S44 is allowed if the user B hopes for the attendance of the user C and the user B is allowed to perform an inviting operation. In step S46, the user C, who uses the terminal apparatus 18, attends the online conference.

In the example operation depicted in FIG. 9, the sharing range is renewed at the time when the composition of attendees at the online conference changes (refer to step S48). When the organizing user A starts to share a document in step S50, the online conference server 12 distributes the document to each attendee within the sharing range (refer to step S48). The document is not delivered to an attendee who is at the online conference but who is outside the sharing range, that is, who has no relationship with the organizing user (refer to step S48). Since it is determined for each attendee whether to allow the attendee to use the document, an information security incident in which the document is disclosed by mistake to an attendee who is not an intended recipient can be prevented from occurring. When other documents are shared, an operation similar to the above operation is performed.

In FIG. 9, the user B exits the online conference in step S51. The change in the composition of attendees at the online conference is accompanied by the renewal of the sharing range (refer to step S52). In the example operation depicted in FIG. 9, the user C is connected to the user A via the user B, that is, recognized as having a relationship with the user A via the user B. In this case, the user B is the intermediary user for the user C, and if the intermediary user exits, an entity that connects the user C and the user A is lost. In the example configuration depicted in FIG. 9, the user C is outside the sharing range after the renewal, and the user C is forbidden to use a document at the time when the user B exits (refer to step S52). For example, the delivery of the document to the terminal apparatus 18 may be stopped, or a document that has been made illegible (such as blurred) may be delivered to the terminal apparatus 18 (refer to a symbol S52a). In this example operation, the user C is a staff member, and the user B is a person in a position of responsibility. In such a case, document usage by a staff member is restricted when a person in a position of responsibility is absent.

In the example operation described above, when document usage is restricted, the attendance at an online conference itself may be restricted. For example, restriction of the online attendance of the user C, who has been invited, may be enforced at the time when the user B, who has invited the user C, exits. The user A, who is the organizer, may determine whether to allow the online attendance to continue.

Figure 10:
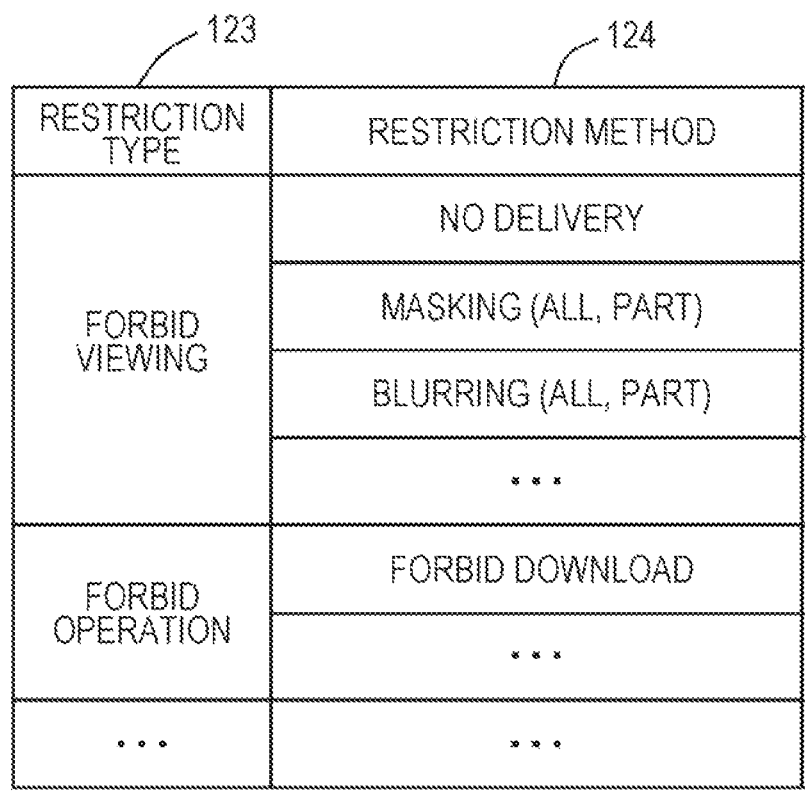
FIG. 10 is an illustration depicting several restriction methods.

FIG. 10 depicts restriction types 123 and restriction methods 124. When document usage is to be restricted, various restriction methods can be adopted as depicted in FIG. 10. For example, when viewing is to be forbidden, apart from forbidding the delivery of a document, processing such as masking all or part of a document or blurring all or part of a document can be selected. When an operation is to be forbidden, download of a document may be forbidden. Other processing such as manipulating or printing a document may also be forbidden.

FIG. 11 depicts another example configuration of a relationship information DB. A relationship information DB 40A includes multiple pieces of relationship information 84 each corresponding to a record. The pieces of relationship information 84 each include information such as an item "relationship information ID" 86, an item "user ID of starting point of relationship" 88A, an item "user ID of end point of relationship" 90A, an item "starting date of relationship" 92, an item "expiration date" 94, and an item "additional condition" 122. Relationships having directionality are controlled in the relationship information DB 40A (refer to a symbol 125). A user who is the starting point of relationship is specified by the item "user ID of starting point of relationship" 88A, and a user who is the end point of relationship is specified by the item "user ID of end point of relationship" 90A. If the user ID (such as 0002) of the end point of relationship in one piece of relationship information coincides with the user ID (such as 0002) of the starting point of relationship in another piece of relationship information, it is determined that an indirect relationship is formed. If three or more pieces of relationship information have multiple links each successively connecting two pieces of relationship information having a common user ID, it is also determined that one or more indirect relationships are formed.

Various conditions can be added as the additional condition 122. For example, a relationship may be approved if the attribute of a document or an organizer satisfies a certain requirement, and a relationship may be denied if the attribute of a document or an organizer does not satisfy a certain requirement.

When a piece of relationship information is registered, a rank representing a handling level may be registered for the piece of relationship information. In such a case, the expiration date or the restriction of the usage of the piece of relationship information may be changed in accordance with the rank. For example, the expiration date of a piece of relationship information of A rank may be set to indefinite, and the expiration date of a piece of relationship information of B rank may be set to a specific date. Similarly to the ranks assigned to relationship information, each user on the user control table 38 may be assigned a rank, which may be registered on the user control table 38. The expiration date or the restriction of the usage of a piece of relationship information may be changed in accordance with the rank assigned to a user.

Figure 12:
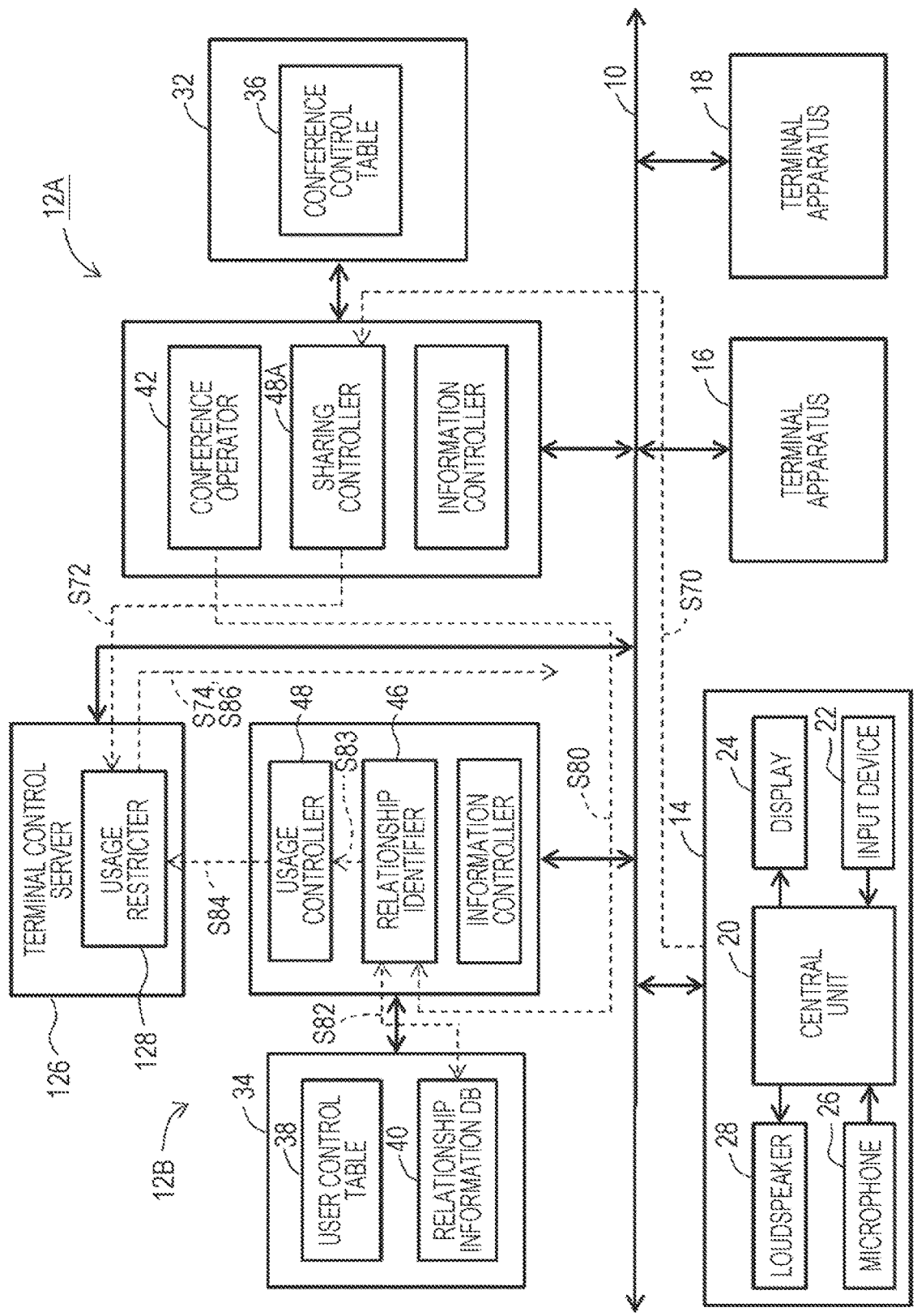
FIG. 12 is a block diagram depicting an online conference system according to another of the exemplary embodiments.

FIG. 12 depicts an online conference system according to another exemplary embodiment. The same components as are depicted in FIG. 1 are denoted by the same symbols in FIG. 12 and are not repeatedly described herein.

The online conference system includes an online-conference operation apparatus 12A, a document-usage control apparatus 12B, and a terminal control server 126. These apparatuses 12A, 12B, and 126 are each formed by an information processing apparatus including a processor.

The online-conference operation apparatus 12A includes a sharing controller 48A in addition to the conference operator 42. The sharing controller 48A is configured to distribute a document to be shared at an online conference to each attendee at the online conference.

The document-usage control apparatus 12B includes the relationship identifier 46 and the usage controller 48. The terminal control server 126 includes a usage restricter 128. The usage restricter 128 is configured to restrict document usage for the terminal apparatuses 14, 16, and 18 in accordance with an instruction provided by the usage controller 48. The terminal control server 126 is configured to monitor the states of the multiple terminal apparatuses 14, 16, and 18 and restrict the operations and processes of these terminal apparatuses, as necessary.

In the example depicted in FIG. 12, the terminal apparatus 14 sends a document to be shared to the online-conference operation apparatus 12A (refer to S70). The sharing controller 48A sends the document to the terminal control server 126 (refer to S72). If an instruction regarding usage restriction of the document is not provided, the terminal control server 126 distributes the document to each attendee (refer to S74).

The conference operator 42 sends information regarding attendees at the online conference to the relationship identifier 46 (refer to S80). The relationship identifier 46 refers to the relationship information DB 40 and identifies whether each attendee has a relationship with the organizing user (refer to S82). The result of identification is provided to the usage controller 48 (refer to S83). The usage controller 48 provides the usage restricter 128 with an instruction for usage restriction (refer to S84). The instruction includes user information. The usage restricter 128 does not deliver the document to a user having no relationship and delivers the document to a user having a relationship (refer to S86).

The online-conference operation apparatus 12A may be formed by one or more information processing apparatuses. The document-usage control apparatus 12B may be formed by one or more information processing apparatuses. The online-conference operation apparatus 12A and the document-usage control apparatus 12B may be formed by a single information processing apparatus. As described above, the document-usage control apparatus 12B may restrict document usage, or the document-usage control apparatus 12B may provide another apparatus with an instruction for restricting document usage.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document-usage control apparatus comprising:
a memory in which a piece of relationship information is registered for each pair of users, the piece of relationship information indicating a relationship between the pair of users; and
a processor configured to:
generate an attendance range which is a tree-structure of attendees at an online conference based on the piece of relationship information between each pair of the attendees;
generate a sharing range which is another tree-structure of the attendees based on a direct and indirect relationship to a particular attendee, such that the sharing range includes a first attendee based on an indirect relationship of the first attendee to a second attendee through an intermediary attendee between the first attendee and the second attendee, wherein a direct relationship exists between the first attendee and the intermediary attendee and between the second attendee and the intermediary attendee, but does not exist between the first attendee and the second attendee;
control use of a document to be shared at the online conference for each user attending the online conference, such that the document is shared only among attendees of an overlapping portion of the attendance range and the sharing range; and
upon detecting a leaving of the intermediary attendee from the online conference, modify the sharing range to remove the first attendee from the sharing range while the second attendee remains in the sharing range.

2. The document-usage control apparatus according to claim 1,
wherein the relationship between the pair of users indicated by each piece of relationship information is a direct relationship involving no intermediary user,
an indirect relationship involving one or more intermediary users is formed by a chain of a plurality of direct relationships, and
the processor is configured to control the use of the document based on one or more direct relationships and one or more indirect relationships, the one or more direct relationships being indicated by the one or more pieces of relationship information, the one or more indirect relationships being formed by the one or more direct relationships.

3. The document-usage control apparatus according to claim 2, wherein
the indirect relationship is a relationship between an organizing user who organizes the online conference and a specific user who is connected to the organizing user via the one or more intermediary users, and
the second attendee is the organizing user, and the first attendee is the specific user.

4. The document-usage control apparatus according to claim 3,
wherein the processor is configured to:
restrict the use of the document by the specific user when any one of the one or more intermediary users involved in the indirect relationship exits the online conference after the processor allows the specific user to use the document based on the indirect relationship.

5. The document-usage control apparatus according to claim 2,
wherein the one or more pieces of relationship information registered in the memory include a plurality of pieces of relationship information, and
the processor is configured to identify the indirect relationship by sequentially following the plurality of direct relationships in a user tree having an organizing user as a starting point, the indirect relationship being identified based on the plurality of pieces of relationship information, the user tree corresponding to the another tree-structure of the attendees with the particular attendee being the organizing user.

6. The document-usage control apparatus according to claim 5,
wherein the processor is configured to identify the indirect relationship in accordance with a specified search condition.

7. The document-usage control apparatus according to claim 1,
wherein, apart from the attendance range for the online conference, the sharing range for the document is defined and generated for controlling the use of the document to be shared at the online conference for each user attending the online conference.

8. The document-usage control apparatus according to claim 7,
wherein the sharing range is a relationship range defined based on the one or more pieces of relationship information within the attendance range.

9. The document-usage control apparatus according to claim 8,
wherein the processor is configured to renew the relationship range when the attendance range changes, which then causes the processor to perform a renewal of the sharing range.

10. The document-usage control apparatus according to claim 2,
wherein each piece of relationship information includes information specifying a pair of users who have a direct relationship with each other.

11. The document-usage control apparatus according to claim 10,
wherein each piece of relationship information further includes a timing condition regarding the direct relationship.

12. An online conference system comprising:
an online-conference operation apparatus configured to provide a plurality of users with an online conference service; and
a document-usage control apparatus configured to control use of a document to be shared at an online conference held based on the online conference service,
wherein the document-usage control apparatus includes:
a memory in which a piece of relationship information is registered for each pair of users, the piece of relationship information indicating a relationship between the pair of users, and
a processor configured to:
generate an attendance range which is a tree-structure of attendees at the online conference based on the piece of relationship information between each pair of the attendees;
generate a sharing range which is another tree-structure of the attendees based on a direct and indirect relationship to a particular attendee, such that the sharing range includes a first attendee based on an indirect relationship of the first attendee to a second attendee through an intermediary attendee between the first attendee and the second attendee, wherein a direct relationship exists between the first attendee and the intermediary attendee and between the second attendee and the intermediary attendee, but does not exist between the first attendee and the second attendee;

control use of a document to be shared at the online conference for each user attending the online conference, such that the document is shared only among attendees of an overlapping portion of the attendance range and the sharing range; and upon detecting a leaving of the intermediary attendee from the online conference, modify the sharing range to remove the first attendee from the sharing range while the second attendee remains in the sharing range.

13. The online conference system according to claim 12, wherein the document-usage control apparatus restricts the use of the document or provides another apparatus with an instruction for restricting the use of the document.

14. The online conference system according to claim 13, wherein the restriction of the use of the document includes at least one of restriction of viewing the document and restriction of manipulating the document.

15. A non-transitory computer readable medium storing a program causing an information processing apparatus to execute a process, the process comprising:

registering a piece of relationship information in a memory for each pair of users, the piece of relationship information indicating a relationship between the pair of users;

generating an attendance range which is a tree-structure of attendees at an online conference based on the piece of relationship information between each pair of the attendees;

generating a sharing range which is another tree-structure of the attendees based on a direct and indirect relationship to a particular attendee, such that the sharing range includes a first attendee based on an indirect relationship of the first attendee to a second attendee through an intermediary attendee between the first attendee and the second attendee, wherein a direct relationship exists between the first attendee and the intermediary attendee and between the second attendee and the intermediary attendee, but does not exist between the first attendee and the second attendee;

controlling use of a document to be shared at the online conference for each user attending the online conference, such that the document is shared only among attendees of an overlapping portion of the attendance range and the sharing range; and upon detecting a leaving of the intermediary attendee from the online conference, modifying the sharing range to remove the first attendee from the sharing range while the second attendee remains in the sharing range.

16. The document-usage control apparatus according to claim 1, wherein
the processor is configured to control use of the document to be shared at the online conference, such that the document that is readable is delivered to terminals of attendees of an overlapping portion of the attendance range and the sharing range, and the document that is edited to be illegible by the processor is delivered to terminals of other attendees within the attendance range outside the sharing range.

* * * * *